(12) United States Patent
Park et al.

(10) Patent No.: US 11,703,854 B2
(45) Date of Patent: Jul. 18, 2023

(54) ELECTRONIC CONTROL UNIT AND VEHICLE CONTROL METHOD THEREOF

(71) Applicant: LG Electronics Inc., Seoul (KR)

(72) Inventors: Minkyu Park, Seoul (KR); Junho Moon, Seoul (KR); Janghyung Cho, Seoul (KR); Jonghwan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 16/732,953

(22) Filed: Jan. 2, 2020

(65) Prior Publication Data

US 2020/0209847 A1 Jul. 2, 2020

(51) Int. Cl.
| | | |
|---|---|---|
| G05D 1/00 | (2006.01) | |
| H04Q 9/02 | (2006.01) | |
| G08G 1/16 | (2006.01) | |
| H04N 23/90 | (2023.01) | |
| H04N 23/698 | (2023.01) | |
| H04N 23/951 | (2023.01) | |

(52) U.S. Cl.
CPC ........... *G05D 1/0038* (2013.01); *G08G 1/166* (2013.01); *H04N 23/698* (2023.01); *H04N 23/90* (2023.01); *H04N 23/951* (2023.01); *H04Q 9/02* (2013.01); *H04Q 2213/002* (2013.01)

(58) Field of Classification Search
CPC ......... G05D 1/0038; G05D 2201/0213; G05D 1/0022; G08G 1/166; G08G 1/167; H04N 5/23232; H04N 5/23238; H04N 5/247; H04N 5/23293; H04Q 9/02; H04Q 2213/002; G08C 2201/51; G08C 17/02
See application file for complete search history.

(56) References Cited

U.S. PATENT DOCUMENTS

| | | | | |
|---|---|---|---|---|
| 11,181,905 | B2 * | 11/2021 | Alalao | .................. H04W 4/024 |
| 2020/0192352 | A1 * | 6/2020 | Rastoll | ................. G05D 1/0044 |

FOREIGN PATENT DOCUMENTS

| | | |
|---|---|---|
| JP | 2006142920 | 6/2006 |
| KR | 20160074108 | 6/2016 |
| KR | 20180057387 | 5/2018 |
| KR | 20180080474 | 7/2018 |
| KR | 20180082080 | 7/2018 |

* cited by examiner

*Primary Examiner* — Jeff A Burke
*Assistant Examiner* — Sihar A Karwan
(74) *Attorney, Agent, or Firm* — Fish & Richardson P.C.

(57) ABSTRACT

An electronic control unit provided in a vehicle is provided. The electronic control unit comprises a communication unit for receiving information on vehicle electronic devices from one or more vehicle electronic devices provided in the vehicle, and a processor for selecting the information on vehicle electronic devices from any one of the vehicle electronic devices in response to occurrence of an event and controlling the communication unit to first transmit the selected information to a server.

20 Claims, 8 Drawing Sheets

ELECTRONIC CONTROL UNIT AND VEHICLE CONTROL METHOD THEREOF

CROSS-REFERENCE TO RELATED APPLICATIONS

Pursuant to 35 U.S.C. § 119(a), this application claims the benefit of earlier filing date and right of priority to International Application No. PCT/KR2019/000018, filed on Jan. 2, 2019, the contents of which is incorporated by reference herein in its entirety.

BACKGROUND OF THE INVENTION

1. Field of the Invention

The present invention relates to an electronic control unit built in a vehicle and a vehicle control method thereof. Moreover, the present invention relates to a vehicle control system comprising the electronic control unit.

2. Background of the Invention

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

As the convenience function and the safety function are applied to the vehicle, the amount of data transmitted and received between an external device located outside the vehicle and an internal device built in the vehicle has been rapidly increased. This is because that the internal device transmits internal information generated therein to a server and the server transmits external information, which can be used by the internal device, to the vehicle.

Fifth generation mobile communication (5G network) has been developed simultaneously with the advent of an autonomous vehicle. The fifth generation mobile communication is a next generation communication technology subsequent to fourth generation LTE-Advanced mobile communication, and predicts mass data transmission such as ultra-high definition image or 3D stereoscopic image, 360VR image (or 360° video), and hologram.

In the fifth generation mobile communication, it is expected that latency which means the time required to transmit and receive data between a vehicle and a base station server will be faster than that in the fourth generation mobile communication as much as ten times. If the autonomous vehicle uses the fifth generation mobile communication, the time required for data transmission and reception becomes shorter, and thus a control speed for avoiding an obstacle or another vehicle becomes faster, whereby safety of autonomous driving is enhanced.

Various vehicle related services considered to be impossible have been developed in accordance with the advantages of the fifth generation mobile communication.

SUMMARY OF THE INVENTION

Therefore, an object of the present invention devised to substantially obviate one or more problems due to limitations and disadvantages of the related art is to provide an electronic control unit, which may provide new services using next generation mobile communication, and a vehicle control system comprising the same.

Another object of the present invention is to provide an electronic control unit, in which a third party who didn't get on a vehicle may remotely control driving of the vehicle, and a vehicle control system comprising the same.

Moreover, the present invention is to provide an electronic control unit, which may provide the same status as that the third party got on the vehicle even though the third party didn't get on the vehicle, and a vehicle control system comprising the same.

The present invention is to provide an electronic control unit, which may maximize safety of a passenger who got on the vehicle considering a network status in a state that the vehicle is controlled by the third party, and a vehicle control system comprising the same.

According to the present invention, an electronic control unit, a vehicle control method thereof and a vehicle control system comprising the electronic control unit are provided.

To achieve these and other advantages and in accordance with the purpose of the invention, as embodied and broadly described herein, an electronic control unit built in a vehicle comprises a communication unit for receiving a control command from a user input unit located outside the vehicle; and a processor for transmitting the control command to one or more vehicle electronic devices provided in the vehicle such that one or more of the vehicle electronic devices operate in accordance with the control command, wherein the processor measures communication service quality between the communication unit and the user input unit, selects at least one of a plurality of cameras provided in the vehicle based on the communication service quality, and controls the communication unit to transmit an image acquired from the selected camera to the user input unit.

According to one embodiment, the communication service quality may include at least one of latency and a bandwidth.

According to one embodiment, the processor may transmit a speed limit message for limiting a maximum speed, which can be driven by the vehicle, based on the communication service quality through the communication unit.

According to one embodiment, the processor may transmit a speed control message for controlling a driving speed of the vehicle in accordance with the communication service quality through the communication unit, and the driving speed of the vehicle may be changed by the speed control message even without a driver's intervention.

According to one embodiment, the processor may control the communication unit such that the control command is not transmitted to one or more of the vehicle electronic devices even though the control command is received if the latency does not satisfy a reference condition.

According to one embodiment, the processor may generate 360VR image based on one point of the vehicle by using a plurality of images acquired from the plurality of cameras.

According to one embodiment, the processor may determine a viewing angle based on the bandwidth and select at least one of the plurality of cameras to generate the 360VR image corresponding to the viewing angle.

According to one embodiment, at least one of a center point and a center direction of the viewing angle may be changed depending on a user input received in the user input unit, and at least one camera may be changed depending on at least one of the center point and the center direction.

According to one embodiment, the processor may limit generation of the 360VR image such that the viewing angle is changed within only a predetermined range if a remote control mode for changing a driving direction of the vehicle is executed in accordance with the control command received from the user input unit.

According to one embodiment, the processor may control resolution of an image based on the bandwidth, and may control the communication unit to transmit a processing image, of which resolution has been controlled, instead of the image, to the user input unit.

The present invention provides a vehicle control system comprising user input units and an electronic control unit.

The vehicle control system comprises the user input units for generating a control command for remotely controlling a vehicle based on a user input; and the electronic control unit for transmitting the control command to one or more vehicle electronic devices provided in the vehicle such that one or more of the vehicle electronic devices operate in accordance with the control command, wherein the electronic control unit measures communication service quality between the user input units, selects at least one of a plurality of cameras provided in the vehicle based on the communication service quality, and transmits an image acquired from the selected camera to the user input units, and the user input units display the image received from the electronic control unit.

According to one embodiment, the electronic control unit may generate 360VR image based on one point of the vehicle by using a plurality of images acquired from the plurality of cameras, and the image transmitted to the user input units may be at least a portion of the 360VR image.

According to one embodiment, the electronic control unit may determine a viewing angle based on the communication service quality and select at least one of the plurality of cameras to generate at least a portion of the 360VR image corresponding to the viewing angle.

According to one embodiment, the electronic control unit may control resolution of the image based on the communication service quality, and may transmit a processing image, of which resolution has been controlled, instead of the image, to the user input units.

According to one embodiment, the electronic control unit may limit a maximum speed, which can be driven by the vehicle, based on the communication service quality.

According to one embodiment, the user input units may transmit a message for changing at least one of a center point and a center direction of the viewing angle to the electronic control unit in response to reception of a user input, and the electronic control unit may generate a new 360VR image, in which at least one of the center point and the center direction has been changed, in response to the message, and may transmit the new 360VR image to the user input units.

The present invention provides a vehicle control method of an application for providing a remote control service to remotely control a vehicle.

The vehicle control method comprises receiving a control command transmitted to the vehicle in which the application is provided, from user input units; and transmitting the control command to one or more vehicle electronic devices provided in the vehicle such that one or more vehicle electronic devices operate in accordance with the control command, wherein the vehicle control method further comprises measuring communication service quality between the user input units, selecting at least one of a plurality of cameras provided in the vehicle based on the communication service quality, and transmitting an image acquired from the selected camera to the user input units.

According to one embodiment, the vehicle control method may further comprise generating 360VR image based on one point of the vehicle by using a plurality of images acquired from the plurality of cameras, wherein the image transmitted to the user input units may be at least a portion of the 360VR image.

According to one embodiment, the vehicle control method may further comprise determining a viewing angle based on the communication service quality, wherein at least a portion of the 360VR image corresponding to the viewing angle may be generated.

According to one embodiment, the vehicle control method may further comprise controlling resolution of the image based on the communication service quality, and transmitting a processing image, of which resolution has been controlled, instead of the image, to the user input units.

According to one embodiment, the vehicle control method may further comprise limiting a maximum speed, which can be driven by the vehicle, based on the communication service quality.

The electronic control unit and the vehicle comprising the same according to the present invention have advantageous effects as follows.

The electronic control unit may receive the control command according to a manipulation of a user located outside the vehicle from the user input unit, and may execute various functions related to the vehicle in response to the control command. As a result, the user located at a long distance may control the vehicle by using the user input unit.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
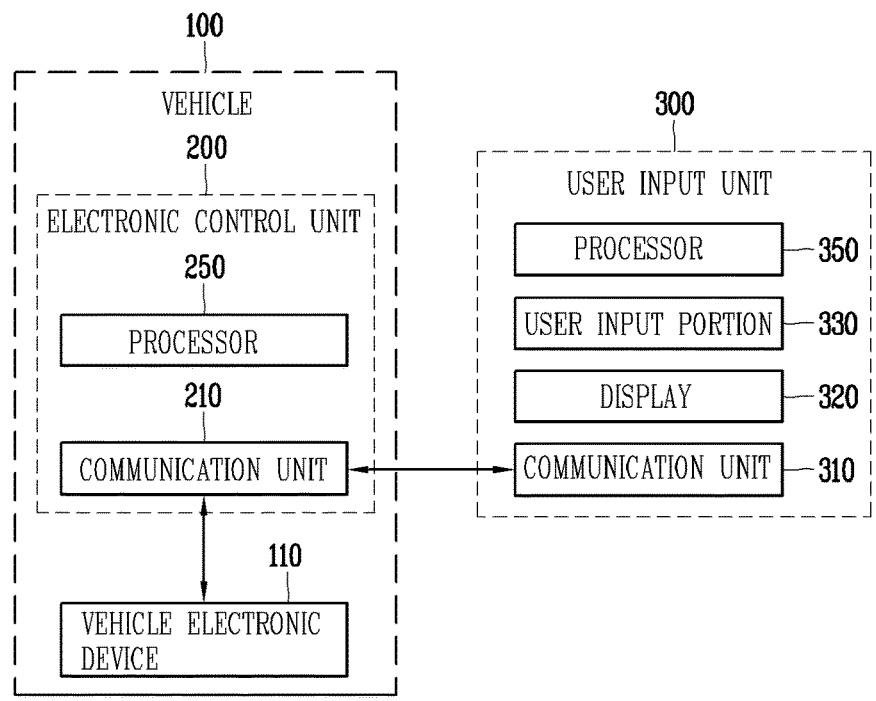
FIG. 1A is a block diagram illustrating a vehicle control system according to the to embodiment of the present invention.

FIG. 1A is a block diagram of a vehicle control system in accordance with an embodiment of the present invention.

A Vehicle control system 10 includes a vehicle 100 and a user input device 300. The vehicle 100 includes an electronic control unit 200 that is mounted on the vehicle 100 and generates control commands to operate one or more electric devices provided in the vehicle 100.

Although not shown in the drawing, a base station or a server for relaying or connecting the vehicle 100 and the user input device 300 may be additionally included in the vehicle control system 10.

The vehicle 100 is defined as a machine that can be moved by a power source, and may include an automobile, a train, a motorcycle, a drone, and the like.

The vehicle 100 may be an autonomous vehicle.

An autonomous vehicle refers to a vehicle capable of performing autonomous travel or driving, and autonomous travel is defined as a travel or driving in which software automatically controls at least one of acceleration, deceleration, and travel direction according to a predetermined algorithm even without driver intervention. In other words, the autonomous driving refers to that a driving control apparatus is automatically manipulated even without a user input applied to the driving control apparatus.

The vehicle 100 may be switched into an autonomous driving mode or a manual driving to mode according to various conditions. For example, one of the autonomous driving mode or the manual driving mode may be executed in response to a request of a third party or a passenger who is not boarding the vehicle.

The vehicle 100 is provided with a plurality of vehicle electric devices 110 and electronic control units 200.

The electric devices refer to devices that are provided in the vehicle 100 and operate electrically. The electric devices may include a driving control device, a camera, a radar, a LiDar, a sensor, a display, a battery, a telecommunication control unit (TCU), an electronic control unit and the like.

As an example of the electric devices 110, a camera 112 may be configured to acquire inner and/or outer images of the vehicle and may be disposed at various positions of the vehicle.

The camera 112 may be a mono camera, a stereo camera, an around view monitoring (AVM) camera or a 360-degree camera.

For example, the camera 112 may be disposed adjacent to a front windshield within the vehicle to acquire a front image of the vehicle. Or, the camera 112 may be disposed adjacent to a front bumper or a radiator grill.

The camera 112 may be disposed adjacent to a rear glass within the vehicle to acquire a rear image of the vehicle. Or, the camera 112 may be disposed adjacent to a rear bumper, a trunk or a tail gate.

The camera 310 may be disposed adjacent to at least one of side windows within the vehicle to acquire a side image of the vehicle. Or, the camera 112 may be disposed adjacent to a side mirror, a fender or a door.

The electronic control unit 200 is provided in the vehicle 100, and may be implemented as an independent device detachable from the vehicle 100 or as a part of the vehicle 100 which is integrally installed in the vehicle 100.

The electronic control unit 200 includes a communication unit 210 and a processor 250.

The electronic control unit 200 is configured to perform a predetermined function of the vehicle and/or the electric device provided in the vehicle 100 based on a user input input to the user input device 300.

The communication unit 210 is configured to perform communications with various components provided in the vehicle 100 The communication unit 210 receives electric device information from one or more electric devices provided in the vehicle 100.

Here, the electric device is an electronic device provided in the vehicle, and the electric device information refers to information generated by the electric device. For example, a front image captured by a front camera mounted on a front surface of the vehicle 100 corresponds to electric device information related to the front camera, and a rear image captured by a rear camera mounted on a rear surface of the vehicle 100 corresponds to electric device information related to the rear camera.

The communication unit 210 may receive various information provided through a controller area network (CAN). In another example, the communication unit 210 may perform communication with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 210 may receive information related to driving of the vehicle from one or more electric devices provided in the vehicle 100. The electric device information may be referred to as 'vehicle driving information.'

Vehicle driving information includes vehicle information and surrounding information related to the vehicle. Information related to the inside of the vehicle with respect to the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (for example, a parking line, a string, another vehicle, a wall, etc.), and the like.

The vehicle driving information is not limited to the example described as above, and may include all kinds of information generated from the elements provided in the vehicle 100.

The communication unit 210 is configured to receive a control command from the user input unit 300 located outside the vehicle.

The processor 250 transmits the control command to one or more of vehicle electronic devices provided in the vehicle 100 such that one or more of the vehicle electronic devices operate in accordance with the control command.

The control command received from the user input unit 300 will be referred to as 'a first control command', and the control command transmitted by the processor 250 to one or more of the vehicle electronic devices will be referred to as 'a second control command'. In other words, the processor 250 may generate the second control command based on the first control command.

The processor 250 may select one or more of a plurality of vehicle electronic devices based on the first control command and transmit the second control command to the selected vehicle electronic devices. The selected vehicle electronic devices are changed depending on the first control command.

The processor 250 may transmit one or more of images received from the camera 112 to the user input unit 300. The camera 112 includes a plurality of cameras, and the processor 250 may select at least one of the plurality of cameras and transmit the selected one to the user input unit 300. At this time, the selected one may be transmitted as its original state, or may be transmitted by being synthesized or processed by the processor 250.

The processor 250 may transmit the vehicle driving information received from the vehicle electronic device 110 to the user input unit 300 together with one or more of the images.

The user input unit 300 may provide the user with the information received from the electronic control unit 200 in at least one of visual, auditory and tactile modes. The user may input a user input for controlling the vehicle 100 by using a user input portion 330 provided in the user input unit 300.

The user input unit 300 includes a communication unit 310, a display 320, the user input portion 330, and a processor 350.

The communication unit 310 is configured to perform communication with the electronic control unit 200 and/or the server.

The display 320 displays (outputs) information processed by the user input unit 300. For example, the display 320 may display execution screen information of an application program driven by the user input unit 300 or user interface (UI) information or graphic user interface (GUI) information according to the execution screen information.

Also, the display 320 may be configured as a stereoscopic display for displaying a stereoscopic image.

A 3D display mode such as a stereoscopic mode (glasses mode), an auto-stereoscopic mode (glassless mode), and a projection mode (holographic mode) may be applied to the stereoscopic display.

Generally, the 3D stereoscopic image includes a left image (image for left-eye) and a right image (image for right-eye). In accordance with a mode for synthesizing a left image and a right image into a 3D stereoscopic image, there are a top-down mode for arranging a left image and a right image within one frame up and down, a left-to-right (L-to-R) (side by side) mode for arranging a left image and a right image within one frame from side to side, a checker board mode for arranging pieces of a left image and a right image in the form of a tile, an interlaced mode for alternately arranging a left image and a right image in a unit of column or row, and a time sequential (frame by frame) mode for alternately displaying a left image and a right image depending on time.

Also, 3D thumbnail images may be generated as one image in such a manner that a left image thumbnail and a right image thumbnail are generated from a left image and a right image of an original image frame and then synthesized. Generally, a thumbnail means a downsized image or downsized still image. The left image thumbnail and the right image thumbnail generated as above may be displayed on the screen at a distance difference between left and right images as much as a depth corresponding to parallax of the left image and the right image, whereby a stereoscopic sense of space may be displayed.

A left image and a right image required for realization of the 3D stereoscopic image may be displayed on a stereoscopic display by a stereoscopic processor. The stereoscopic processor is configured to set a left image and a right image from 3D images (image of a reference time and image of extended time) which are input, or switch 2D images, which are input, to a left image and a right image.

The user input portion 330 is to allow the user to input information, and if the information is input through the user input portion 330, the processor 350 may control the operation of the user input unit 100 to correspond to the input information. The user input portion 330 may include a mechanical input means (or mechanical key, for example, a button, dome switch, jog wheel, jog switch, etc., which is located on front and rear surfaces or a side of the user input unit 300), and a touch input means. As an example, the touch input means may include a virtual key, a soft key or a visual key, which is displayed on a touch screen through software processing, or may include a touch key arranged at a portion other than the touch screen. Meanwhile, the virtual key or the visual key may be displayed on the touch screen while having various shapes. For example, the virtual key or the visual key may be comprised of a graphic, a text, an icon, a video, or their combination.

The processor 350 performs control and processing related to the image received from the electronic control unit 200, or performs a predetermined function to correspond to the user input received through the user input portion 330.

Figure 1B:
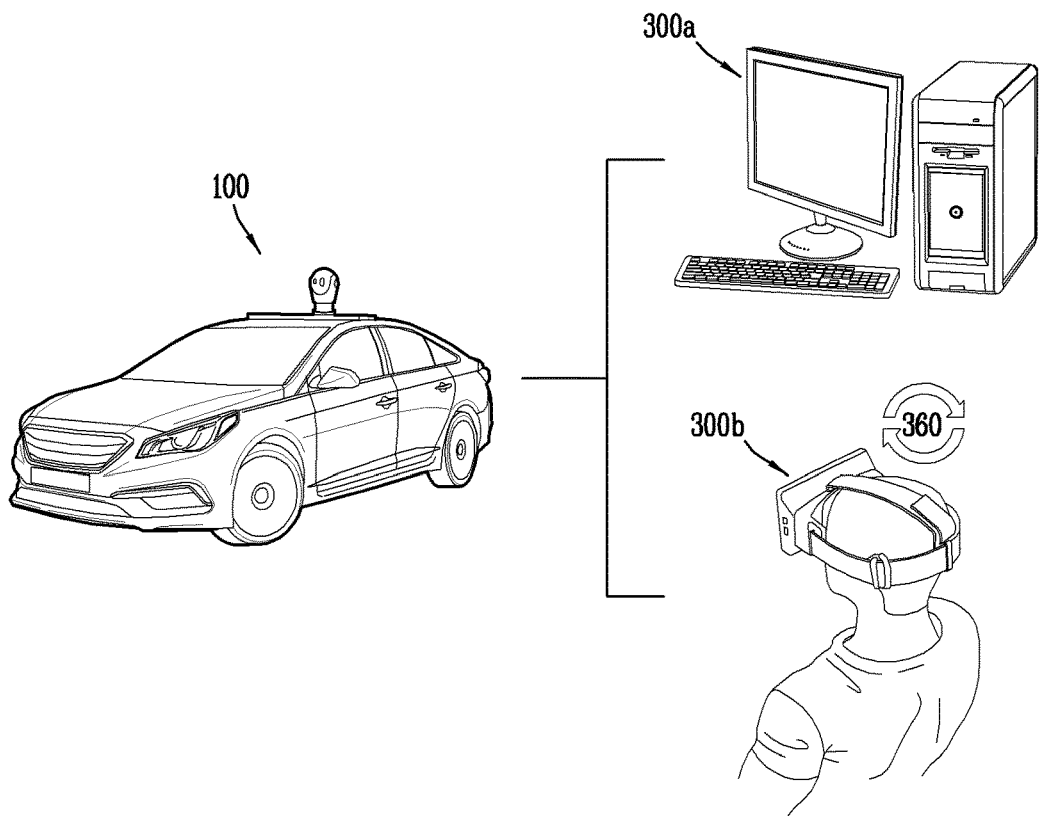
FIG. 1B is an exemplary view illustrating one embodiment of the vehicle control system of FIG. 1A.

FIG. 1B is an exemplary view illustrating one embodiment of the vehicle control system of FIG. 1A.

The user input units 300a and 300b may be categorized into a mobile/portable terminal and a stationary terminal depending on mobility. The mobile terminal may be categorized into a handheld terminal and a vehicle mounted terminal depending on a user's direct portability.

The user input unit may be implemented in the form of a stationary terminal or a mobile terminal.

The mobile terminal described in this specification may include a cellular phone, a smart phone, a laptop computer, a digital broadcasting terminal, personal digital assistants (PDA), a portable multimedia player (PMP), a navigator, a slate PC, a tablet PC, an ultrabook, a wearable device (for example, a smart watch, a smart glass, a head mounted display (HMD)), etc.

However, it will easily be apparent to those skilled in the art that the configuration according to the embodiment disclosed in this specification may be applied to the stationary terminal such as a digital TV, a desktop computer, and a digital signage except that it is applied to the mobile terminal only.

As shown in FIG. 1b, the electronic control unit 200 transmits the image received from the camera 112 provided in the vehicle 100 to the user input units 300a and 300b.

The user input unit 300 outputs the image received from the electronic control unit 200. The user input unit 300 may output a full range image and/or an omnidirectional image, which is called '360VR image'. In this case, 360 means a full range of 360°, and VR means virtual reality.

The user feels the same status that the user is actually located at a space in the image through the 360VR image.

A panorama camera which captures views from all directions of 360° in one photo is an example of the full range image. The full range image refers to an image which captures views, which are viewed when an observer turns one round at the same place, in one image.

A system which captures views in all directions, which can be viewed at a position of an observer, in one image is referred to as an omnidirectional image. The omnidirectional image includes all views that can be viewed by an observer by tilting his/her head back or lowering his/her head as well as turning one round at the same place.

After a plurality of images are acquired, the plurality of images may be connected with one another to generate one full range image. Connecting the images is similar to sewing, and thus is referred to as stitching mode. One camera may be used alternately to obtain a variety of images, or several cameras toward different directions may be used to obtain a variety of images. Also, after an image is taken by a wide-angle lens, a full range image may be obtained through image processing.

A partial portion of the 360VR image is displayed on the display 320 of the user input unit 300. The partial portion is a portion of a view point viewed at a predetermined viewing angle, and may be varied depending on the display 320 provided in the user input unit 300. Also, at least one of the predetermined view point and the predetermined viewing angle may be varied depending on the user input applied to the user input portion 330 of the user input unit 300. Moreover, the portion may be enlarged or downsized by the user input.

The user of the user input unit 300 may check an internal and/or external status of the vehicle with his/her eyes through the image which is output, and may input the user input through the user input portion 330 such that a predetermined function may be executed in the vehicle 100.

Since the user input unit 300 provides the full range image, the user may feel the same status that the user got on the vehicle 100, and may immediately receive an image desired to view.

Meanwhile, the processor 350 of the user input unit 300 generates a first control command based on the user input and transmits the generated first control command to the electronic control unit 200, and the electronic control unit 200 generates a second control command in response to the first control command.

As a result, the user which didn't get on the vehicle may control or manipulate the vehicle at a long distance.

Hereinafter, various embodiments implemented through the electronic control unit 200 and the user input unit 300 described as above will be described.

Figure 2:
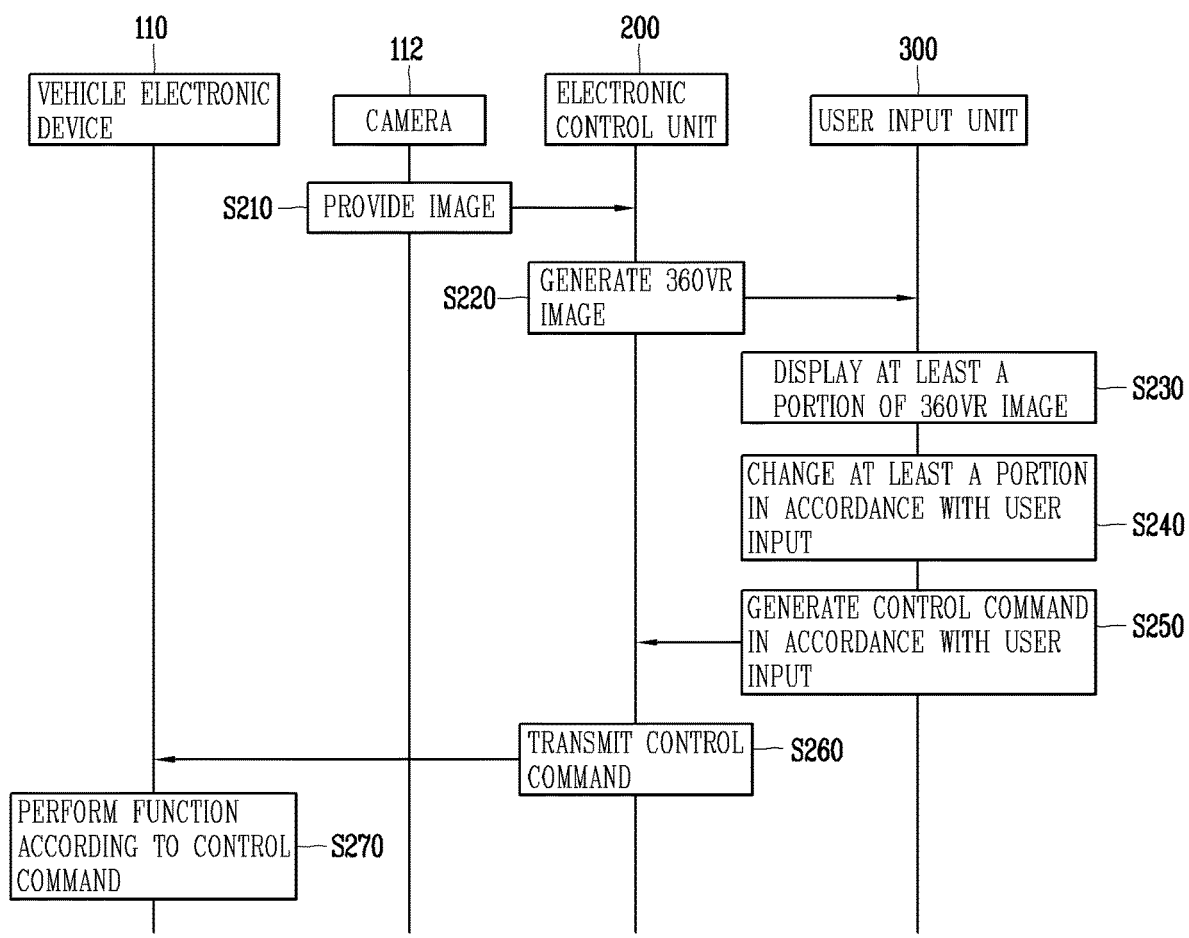
FIG. 2 is a flow chart illustrating an operation of elements according to the vehicle control system of FIG. 1A.

FIG. 2 is a flow chart illustrating an operation of elements according to the vehicle control system of FIG. 1A.

The camera 112 provides an image which is taken to the electronic control unit 200. (S210). The camera 112 includes one or more cameras, and may be categorized into an external camera for taking the outside of the vehicle 100 and an internal camera for taking the inside of the vehicle 100.

The electronic control unit 200 may generate 360VR image by using the image provided from the camera 112, and may transmit the 360VR image to the user input unit 300 (S220).

The electronic control unit 200 may generate at least a portion of the 360VR image in response to a request of the user input unit 300 and transmit the generated portion to the user input unit 300 in real time.

The 360VR image may be generated by another unit. In this case, the electronic control unit 200 may select at least a portion of the 360VR image in response to the request of the user input unit 300 and transmit the selected portion to the user input unit 300.

The user input unit 300 displays at least a portion of the 360VR image (S230). Moreover, the user input unit 300 changes at least a portion displayed in accordance with the user input (S240). At least one of the view point and the viewing angle of the 360VR image may be changed by the user input, whereby at least a portion which is displayed may be changed.

The user input unit 300 may generate a control command in accordance with the user input and transmit the generated control command to the electronic control unit 200 (S250). The communication unit 210 of the electronic control unit 200 receives the control command from the user input unit 300 located outside the vehicle 100.

The electronic control unit 200 transmits the control command to one or more of the vehicle electronic devices such that one or more of the vehicle electronic devices provided in the vehicle operate in accordance with the control command (S260). At this time, the control command received by the electronic control unit 200 may be categorized into the first control command, the control command transmitted from the electronic control unit 200 may be categorized into the second control command.

The vehicle electronic device 110 performs functions according to the control command transmitted from the electronic control unit 200 (S270).

A plurality of vehicle electronic devices are provided in the vehicle 110, and the electronic control unit 200 may select one or more of the vehicle electronic devices based on the first control command and transmit the second control command to the selected vehicle electronic device.

The functions executed by the control command may be all functions that can be executed in the vehicle 100. For example, the functions such as on/off function of an air conditioner for controlling a vehicle indoor temperature, a deceleration function for decelerating a vehicle speed by operating a brake, an acceleration function, a driving direction change function, a destination change function, and an on/off function of autonomous driving may be executed by the control command.

The electronic control unit may receive the control command according to the manipulation of the user located outside the vehicle from the user input unit, and may execute various functions related to the vehicle in response to the control command. As a result, the user located at a long distance may control the vehicle by using the user input unit.

The user should immediately check the indoor and/or outdoor status of the vehicle to control the vehicle by using the user input unit. To this end, the electronic control unit provides the user input unit with 360VR image, and the user input unit displays the 360VR image.

Hereinafter, the control related to the 360VR image will be described in detail.

Figure 3A:
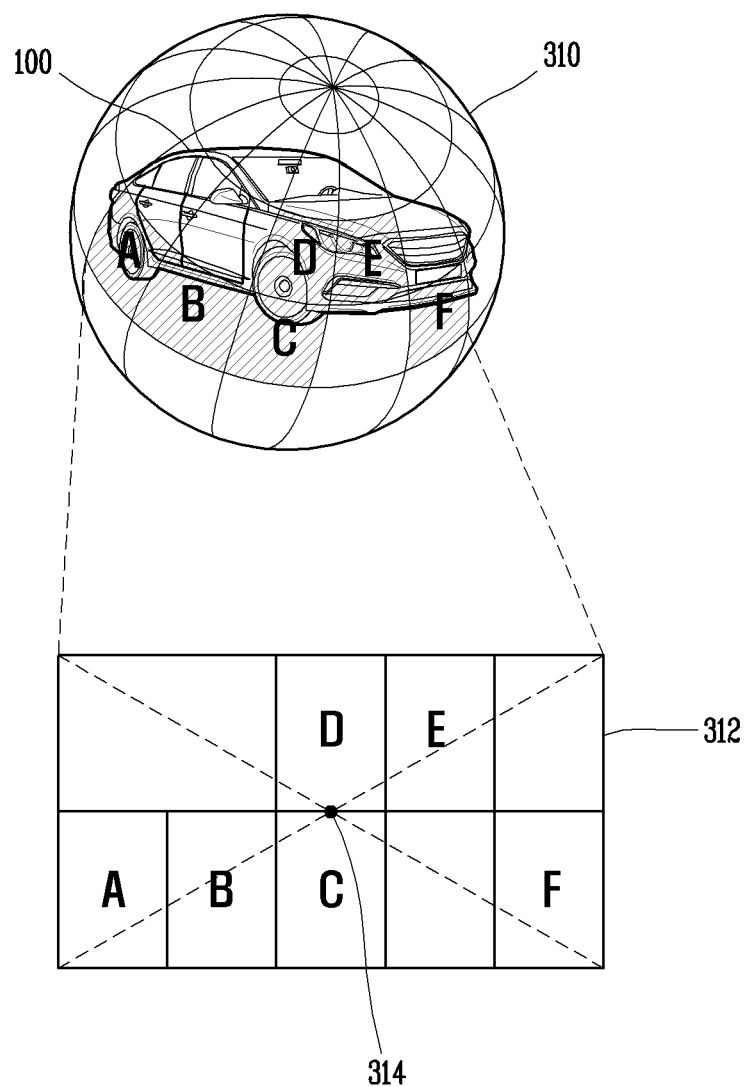
FIGS. 3A and 3B are conceptual views illustrating 360VR image generated by an electronic control unit built in a vehicle.
Figure 3B:
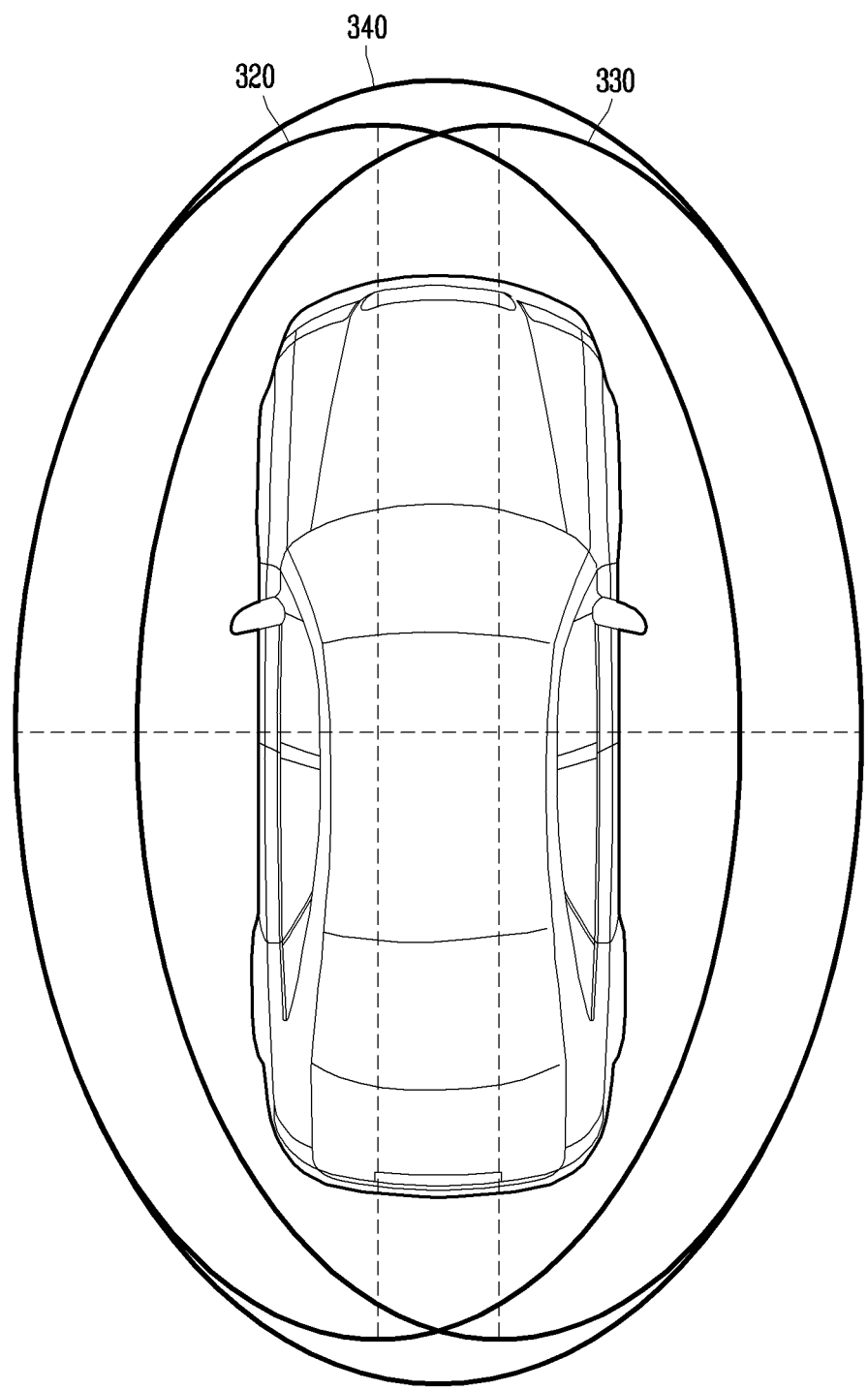

FIGS. 3A and 3B are conceptual views illustrating 360VR image generated by an electronic control unit built in a vehicle.

The 360VR image is generated by the camera provided in the vehicle, and a virtual world 310 based on one point is formed by the 360VR image. The virtual world 310 may be switched to or expressed as 2D image.

The processor 250 may make the 360VR image 312 by using a plurality of images each of which has unique position information. The 360VR image 314 includes a plurality of images A to F arranged based on a center point 314. Arrangement of the plurality of images is determined by the unique position information of the plurality of images.

Position information included in each image may be preset in each camera. For example, first position information may be included in a first image taken by a first camera, and second position information may be included in a second image taken by a second camera. The processor 250 may make the 360VR image 312 by using the position information included in each image.

Meanwhile, since a plurality of cameras are arranged in the vehicle 100, the processor 250 may generate different 360VR images 320, 330 and 340 having their respective center points different from each other. The processor 250 may select any one of a plurality of virtual worlds in accordance with the first control command received from the user input unit 300 and generate 360VR image corresponding to the selected virtual world.

For example, if a request of the 360VR image based on a driver's seat is received from the user input unit 300, the 360VR image 320 based on the driver's seat may be generated. Unlike this case, if a request of the 360VR image based on a passenger's seat is received from the user input unit 300, the 360VR image 330 based on the passenger's seat may be generated. The vehicle based 360VR image 340 based on a center of gravity of the vehicle 100 may be generated.

The processor 250 may generate 360VR image based on one point of the vehicle 100 by using a plurality of images acquired from a plurality of cameras provided in the vehicle 100.

Although not shown, the 360VR image corresponding to the vehicle inside may be generated by the camera arranged inside the vehicle 100.

Hereinafter, a method for providing an image customized for communication service quality will be described in detail.

Figure 4:
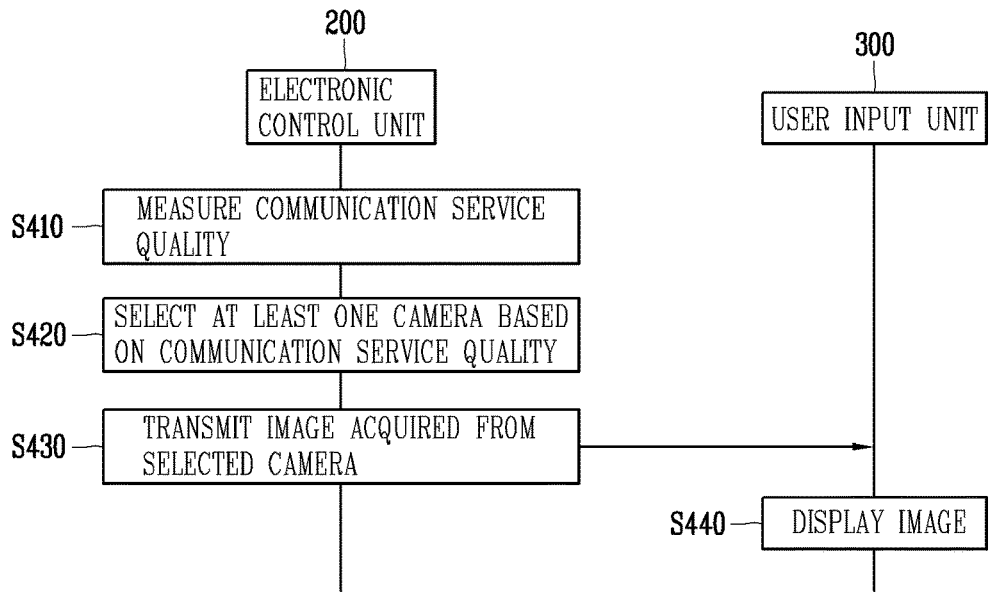
FIGS. 4 and 5 are flow charts illustrating an operation of an electronic control unit based on communication service quality.
Figure 5:
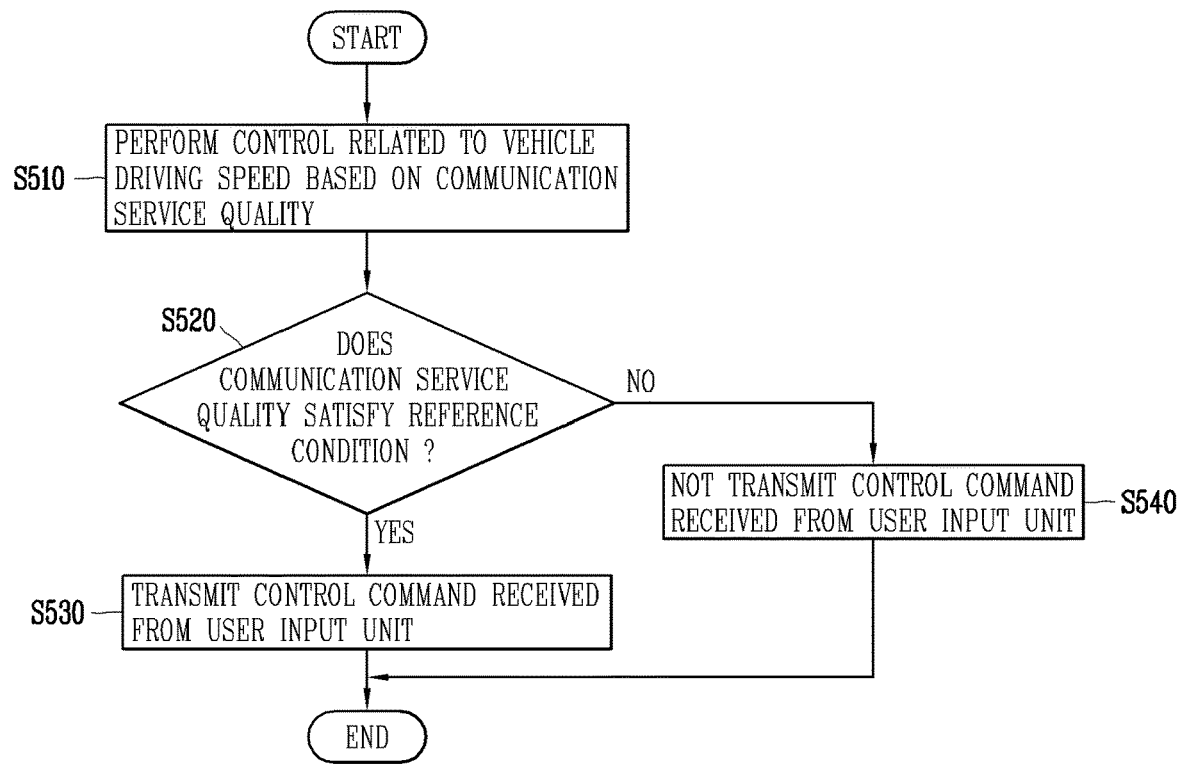

FIGS. 4 and 5 are flow charts illustrating an operation of an electronic control unit based on communication service quality.

The processor 250 of the electronic control unit 200 may measure communication service quality (S410).

For example, the processor 250 may measure communication service quality between the communication unit 210 and the user input unit 300. For another example, the processor 250 may measure communication service quality between an antenna provided in the electronic control unit 200 and a base station.

The communication service quality may include at least one of transmission quality, access quality and reliability. In this case, transmission quality means an error rate of a transmission signal. Access quality is a reference that may access a network without accompanying unfair latency, and means the probability of signal loss or access latency time. In case of reliability, a reliability value may be calculated probabilistically by an annual failure rate for each portion of the network.

Although various modifications may be made in the communication service quality in accordance with the embodiments, at least one of latency and bandwidth will exemplarily be described in the present invention.

The electronic control unit 200 selects at least one camera based on the communication service quality (S420), and transmits the image acquired from the selected camera to the user input unit 300.

The camera which is selected is changed depending on the communication service quality, and thus 360VR image transmitted to the user input unit 300 may be changed.

For example, if the communication service quality satisfies a reference at an optimal state, 360VR image of a highest level may be transmitted to the user input unit 300. Unlike this case, if the communication service quality does not satisfy the reference at a lowest level, 360VR image of a lowest level may be transmitted to the user input unit 300.

A plurality of images received from a plurality of cameras are required to generate 360VR image. The processor 250 may select one or more cameras to make 360VR image based on the communication service quality.

The user input unit 300 displays the image received from the electronic control unit 200 (S440).

Since the vehicle 100 is an object which is moving, communication service quality cannot be always maintained uniformly. If 360VR image of a certain level is transmitted to the user input unit regardless of communication service quality, real time control may be failed due to a communication defect.

In the present invention, since an image of a proper level suitable for communication service quality is transmitted, it is advantageous in that real time control is not failed even in case of a communication defect.

Referring to FIG. 5, the processor 250 of the electronic control unit 200 may perform the control related to a vehicle driving speed based on communication service quality (S510).

For example, the processor 250 may transmit a speed limit message for limiting a maximum speed, which can be driven by the vehicle 100, based on the communication service quality through the communication unit.

As the speed of the vehicle 100 is increased, the amount of data which can be transmitted per unit time or a transmission success rate is reduced. The processor 250 may set a limit speed of the vehicle 100 to enable a remote control by means of the user input unit 300.

If the driver accelerates to be faster than the limit speed, guide information for guiding a limit of acceleration may be output in at least one of visual, auditory and tactile modes. If an accelerating pedal is pressurized to be faster than the limit speed, an output of an engine of the vehicle 100 may be limited to maintain the limit speed. Even in the case that the vehicle 100 automatically drives, the maximum speed of the vehicle 100 is limited to the limit speed.

The processor 250 may transmit a speed control message for controlling a driving speed of the vehicle 100 in accordance with the communication service quality through the communication unit. In this case, the driving speed of the vehicle may be varied by the speed control message even without the driver's intervention.

In other words, the limit speed which enables the remote control according to the user input unit 300 may be varied depending on the communication service quality. In this case, automatic driving of the vehicle 100 may be performed within the maximum speed. For example, automatic driving is performed at a first speed by first service quality. If the communication service quality is changed to second communication service quality, automatic driving may be performed at a second speed corresponding to the second service quality.

The processor 250 may determine whether the communication service quality satisfies a reference condition (S520).

If the communication service quality satisfies the reference condition, the processor 250 transmits the control command received from the user input unit 300 to at least one of the vehicle electronic devices (S530). In other words, the processor 250 transfers the control command to enable the remote control by the user input unit 300.

Unlike this case, if the communication service quality does not satisfy the reference condition, the processor 250 does not transmit the control command received from the user input unit 300 to at least one of the vehicle electronic devices (S540). In other words, the processor 250 controls the communication unit 210 so as not to transmit the second control command to one or more of the vehicle electronic devices even though the first control command is received.

Since execution of the remote control is limited based on communication service quality, an abnormal operation of the vehicle 100 may previously be blocked. For example, if transmission latency of 't' seconds occurs, the user of the user input unit views an image prior to 't' seconds. If the 't' seconds become longer, it is likely that the user generates a control command for generating an accident due to a wrong decision. Therefore, if the transmission latency does not satisfy the reference, the electronic control unit 100 according to the present invention previously blocks occurrence of an accident by limiting function execution according to the control command.

Meanwhile, the electronic control unit 200 according to the present invention may perform the control related to the 360VR image based on the communication service quality.

Figure 6:
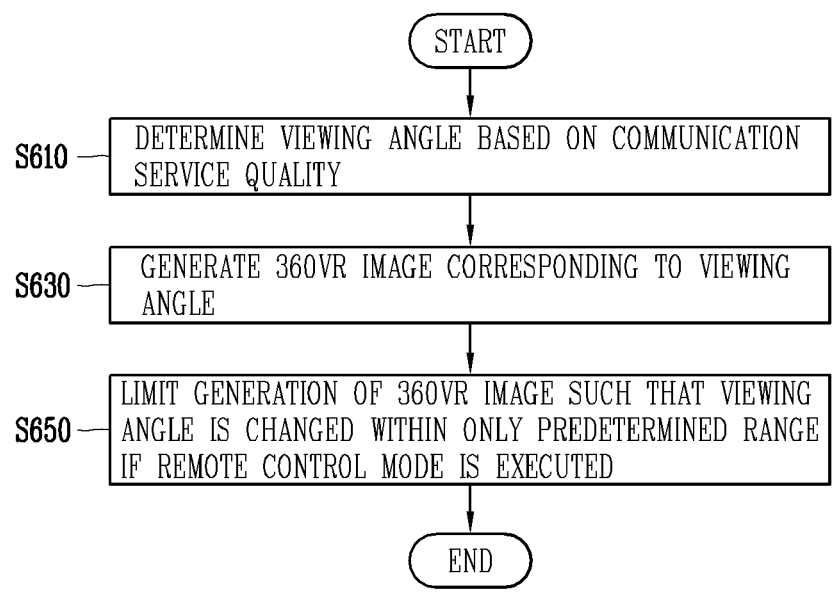
FIG. 6 is a flow chart illustrating an operation of an electronic control unit which generates images based on communication service quality.
Figure 7A:
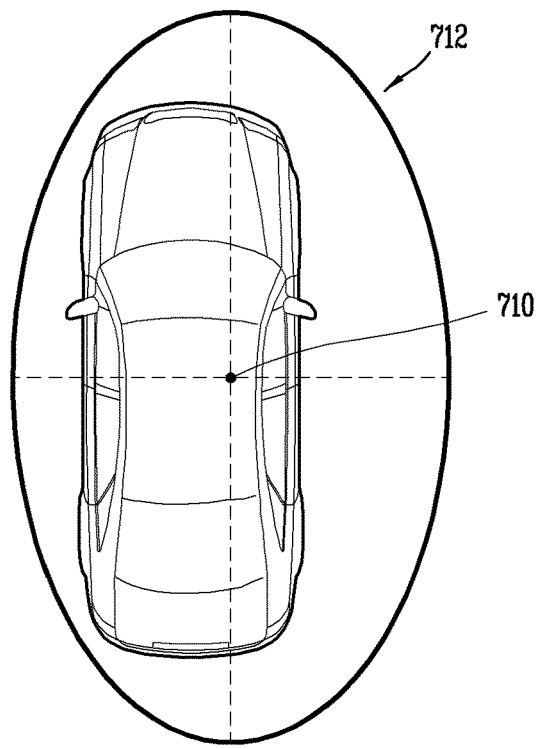
FIGS. 7A and 7B are exemplary views illustrating embodiments of an image generated in accordance with the operation of FIG. 6.
Figure 7B:
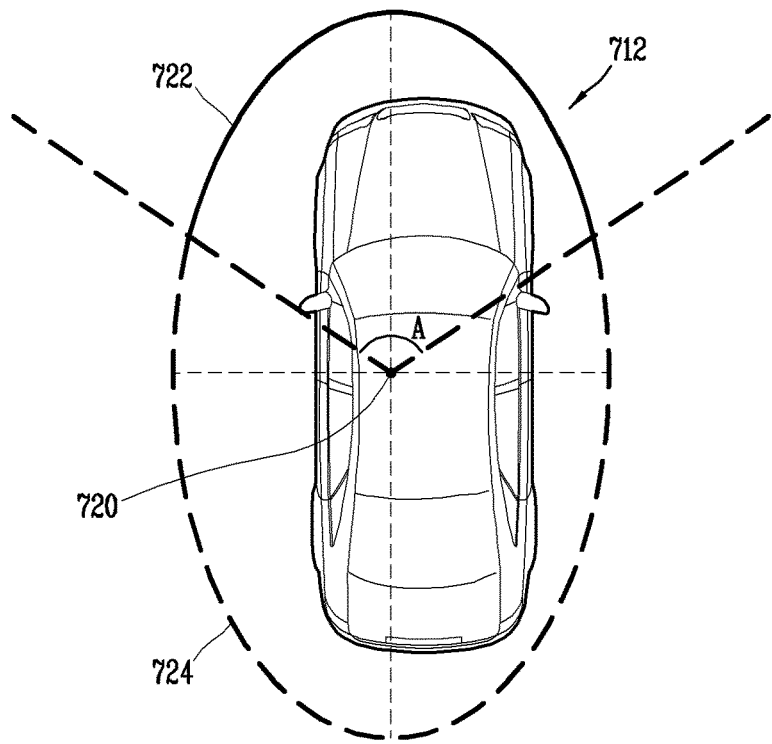

FIG. 6 is a flow chart illustrating an operation of an electronic control unit which generates images based on communication service quality, and FIGS. 7A and 7B are exemplary views illustrating embodiments of an image generated in accordance with the operation of FIG. 6.

The processor 250 of the electronic control unit 200 may determine a viewing angle of the 360VR image based on the communication service quality (S610).

If the communication service quality is within a first range, the first viewing angle is determined, and if the communication service quality is within a second range poorer than the first range, a second viewing angle smaller than the first viewing angle may be determined. In other words, the worse the communication service quality is, the narrower the view viewed by the user of the user input unit 300 through the display 320 is.

For example, if the communication service quality is good, as shown in FIG. 7a, an image, which can observe a full range of 360°, may be generated. Unlike this case, if the communication service quality is fair, as shown in FIG. 7b, an image, which can observe the front 150° of the vehicle 100, may be generated. If the communication service quality is poor, an image having a viewing angle smaller than 150° may be generated.

The processor 250 may generate 360VR image corresponding to the viewing angle (S630).

The processor 250 may determine the viewing angle based on the bandwidth, and may select at least one of the plurality of cameras to generate the 360VR image corresponding to the viewing angle. The processor 250 may generate 360VR image having the determined viewing angle by using the image received from the selected camera.

At least one of a center point and a center direction of the viewing angle may be changed depending on the user input received in the user input unit 300. In this case, at least one camera may be changed depending on at least one of the center point and the center direction of the viewing angle.

For example, 360VR image 710 of a passenger's set, which uses the passenger's seat as a center point as shown in FIG. 7a, or 360VR image 722 of a driver's seat, which uses the driver's seat as a center point as shown in FIG. 7*b* may be generated selectively in accordance with the user input, which is input to the user input unit 300.

As shown in FIG. 7*b*, in a state that a viewing angle A is determined, the center direction of the viewing angle may be changed depending on the user input which is input to the user input unit 300.

Meanwhile, a monitoring mode or a remote control mode may be executed selectively in the user input unit 300. The monitoring mode means that a user has only to perform observation, and is a mode in which the control related to the vehicle 100 is limited. The remote control mode means a mode that the user can perform the control related to the vehicle 100 while performing observation. That is, the user can control the vehicle 100 in the remote control mode, but cannot control the vehicle in the monitoring mode.

If the remote control mode is executed in the user input unit 300, generation of the 360VR image may be limited such that the viewing angle is changed within only a predetermined range (S650).

In more detail, if the remote control mode for changing a driving direction of the vehicle in accordance with the control command received from the user input unit is executed, generation of the 360VR image may be limited such that the viewing angle is changed within only a predetermined range.

If the remote control mode is executed, the driving direction of the vehicle 100 may be changed in real time depending on the user input which is input to the user input unit 300. The user of the user input unit 300 remotely controls the driving direction based on the 360VR image displayed on the display 320. Since front observation should be applied to even the user who performs the remote control, the electronic control unit 200 may limit a generation range of the 360VR image such that the user may check only the image corresponding to the front of the vehicle 100.

For example, as shown in FIG. 7*b*, the 360VR image is generated within only a range of 0° to 180°, and generation of the 360VR image is limited within the range of 180° to 360°. That is, the user of the user input unit 300 cannot check the image corresponding to 180° to 360° through the display 320 of the user input unit 300.

As eyes of the user who controls the vehicle 100 through the remote control mode are limited, the user may concentrate on the remote control.

If an image change to a range that viewing is limited is requested from the user, the user input unit 300 may output guide information for guiding the viewing limit range in at least one of visual, auditory and tactile modes.

Figure 8:
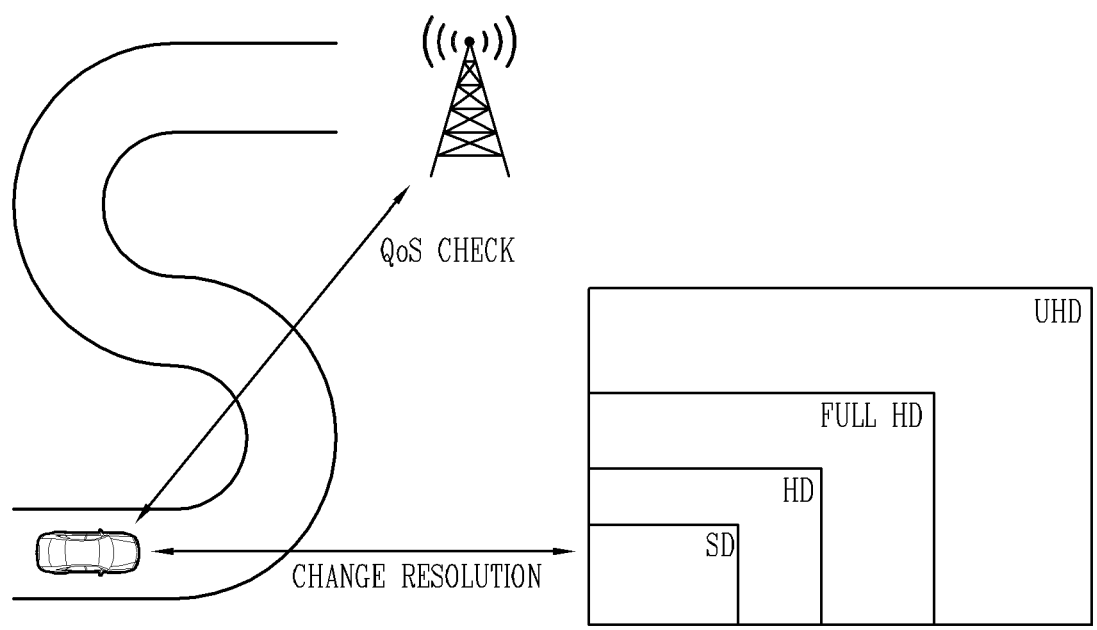
FIG. 8 is a conceptual view illustrating a method for controlling resolution of an image based on communication service quality.

FIG. 8 is a conceptual view illustrating a method for controlling resolution of an image based on communication service quality.

The processor 250 of the electronic control unit 200 may control resolution as well as the viewing angle of the 360VR image on the basis of the communication service quality.

In detail, the processor 250 may control resolution of the 360VR image based on the bandwidth, and may control the communication unit 210 to transmit a processing image, of which resolution has been controlled, to the user input unit 300.

As the vehicle moves, communication service quality of the network, which is provided through the base station, is changed. For example, if the vehicle 100 is located in a 3G environment, a first bandwidth may be allowed in the electronic control unit 200, and if the vehicle 100 is located in a 5G environment, a second bandwidth greater than the first bandwidth may be allowed. The processor 250 may control resolution of the 360VR image on the basis of the bandwidth provided at the position of the vehicle 100. As a result, the user of the user input unit 300 may view the 360VR image without buffering.

Meanwhile, the present invention may be enlarged to the vehicle 100 comprising the electronic control unit 200 described with reference to FIGS. 1 to 8. Moreover, the operations of the electronic control unit 200 may be installed as applications or programs in a system inside the vehicle 100 and thus enlarged to a control method performed by the vehicle 100.

The user input unit 300 may determine a monitoring state or a remote control state, wherein the monitoring state means that the user simply monitors the inside and the outside of the vehicle 100, and the remote control state means that the user performs various controls related to the vehicle 100.

The user input unit 300 may determine whether switching from the monitoring state to the remote control state can be performed, based on the communication service quality of the electronic control unit 200. The user input unit 300 may search for the time required to switch the monitoring state to the remote control state or a point where switching can be performed, and may output guide information for guiding the searched time or the searched point, through the display 320.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic control unit of a vehicle, comprising:
    a communication unit configured to receive a control command from a user input unit located outside of the vehicle; and
    a processor configured to transmit the control command to one or more electronic devices located in the vehicle and configured to operate in accordance with the transmitted control command,
    wherein the processor is configured to:
        measure communication quality between the communication unit of the electronic control unit and the user input unit,
        select, based on the communication quality, at least one of a plurality of cameras located in the vehicle,
        control the communication unit of the electronic control unit to transmit, to the user input unit, a plurality of images acquired from the selected at least one of the plurality of cameras, wherein the processor is configured to measure the communication quality by measuring transmission latency and a transmission bandwidth for transmission of the plurality of images from the vehicle to a fifth generation (5G) base station, and determine, based on the measured communication quality, a viewing angle, and generate a virtual reality (VR) image corresponding to the determined viewing angle, wherein, based on the measured communication quality being within a second range having a communication quality poorer than a communication quality of a first range, a second viewing angle of a second VR image is determined to be smaller than a first viewing angle of a first VR image, and wherein resolution of the first VR image with the first viewing angle is equal to resolution of the second VR image with the second viewing angle.

2. The electronic control unit according to claim 1, wherein the processor is configured to operate in a monitoring mode for monitoring the inside and the outside of the vehicle and a remote control mode for performing controls related to the vehicle by the user input unit, wherein the user input unit is configured to, based on a determination to switch to the remote control mode from the monitoring mode according to the measured communication quality, provide first guide information for switching from the monitoring mode to the remote control mode, and wherein the first guide information includes at least one of a time for switching the monitoring mode to the remote control mode or a point where switching can be performed.

3. The electronic control unit according to claim 2, wherein the processor is configured to transmit, based on the communication quality, a speed control message for controlling a driving speed of the vehicle, the speed control message controlling the driving speed of the vehicle regardless of a driver's intervention.

4. The electronic control unit according to claim 2, wherein the processor is configured to control, based on a determination that the communication quality does not satisfy a reference condition, the communication unit of the vehicle to withhold transmission of the control command to the one or more vehicle electronic devices even though the control command is received by the communication unit from the user input unit.

5. The electronic control unit according to claim 2, wherein the processor is configured to generate, based on one point of the vehicle and by using a plurality of images acquired from the plurality of cameras, a 360 degree virtual reality (360VR) image.

6. The electronic control unit according to claim 5, wherein:

the processor is configured to, based on a user input from the user input unit, change at least one of the point of the vehicle or a viewing angle at the point of the vehicle for generating the 360VR image, and the processor is configured to, based on the changed at least one of the point of the vehicle or a viewing angle at the point of the vehicle, change selection of the at least one of the plurality of cameras.

7. The electronic control unit according to claim 6, wherein the processor is configured to limit, based on the remote control mode for changing a driving direction of the vehicle being executed in accordance with the control command received from the user input unit, generation of the 360VR image by limiting the changing of the viewing angle in a predetermined range corresponding to a front of the vehicle, and wherein the user input unit is configured to, based on an image change to a range that limits viewing being received by the user input unit, provide second guide information for guiding the viewing limit range in at least one of visual, auditory, or tactile modes.

8. The electronic control unit according to claim 1, wherein the processor is configured to control, based on the measured bandwidth, resolution of the transmitted plurality of images, and control the communication unit to transmit, to the user input unit, a plurality of processed images by controlling the resolution of the plurality of images.

9. The electronic control unit according to claim 1, wherein the processor is configured to, based on the vehicle exceeding the maximum speed of the vehicle, provide guide information for guiding a limit of acceleration of the vehicle.

10. The electronic control unit according to claim 1, wherein the processor is configured to, based on the vehicle exceeding the maximum speed of the vehicle, limit a speed of the vehicle to the maximum speed.

11. A vehicle control system comprising:

user input units configured to generate, based on a user input, control command for remotely controlling a vehicle; and an electronic control unit configured to transmit the control command to one or more electronic devices located in the vehicle and configured to operate in accordance with the transmitted control command, wherein the electronic control unit is configured to measure communication quality between the user input units and the electronic control unit, select, based on the communication quality, at least one of a plurality of cameras located in the vehicle, and transmit, to the user input units, a plurality of images acquired from the selected at least one of the plurality of cameras, and the user input units are configured to display the image received from the electronic control unit, wherein the electronic control unit is configured to measure the communication quality by measuring transmission latency and a transmission bandwidth for transmission of the plurality of images from the vehicle to a fifth generation (5G) base station, and wherein the electronic control unit is configured to (i) determine, based on the measured communication quality, a viewing angle and (ii) generate a VR image corresponding to the determined viewing angle, wherein, based on the measured communication quality being within a second range having a communication quality poorer than a communication quality of a first range, a second viewing angle of a second VR image is determined to be smaller than a first viewing angle of a first VR image, wherein resolution of the first VR image with the first viewing angle is equal to resolution of the second VR image with the second viewing angle.

12. The vehicle control system according to claim 11, wherein the electronic control unit is configured to generate, based on one point of the vehicle and by using a plurality of images acquired from the plurality of cameras, a 360 degree virtual reality (360VR) image, and the image transmitted to the user input units is at least a portion of the 360VR image.

13. The vehicle control system according to claim 11, wherein the user input unit is configured to:

operate in a monitoring mode for monitoring the inside and the outside of the vehicle and a remote control mode for performing controls related to the vehicle, and provide, based on a determination to switch to the remote control mode from the monitoring mode according to the measured communication quality, first guide information for switching from the monitoring mode to the remote control mode, and wherein the first guide information includes at least of one of a time for switching the monitoring mode to the remote control mode or a point where switching can be performed.

14. The vehicle control system according to claim 11, wherein the electronic control unit is configured to control, based on the communication quality, resolution of the image, and transmit, to the user input units, a plurality of processed images by controlling the resolution of the plurality of images.

15. The vehicle control system according to claim 11, wherein the electronic control unit is configured to limit, based on the communication quality, a maximum speed of the vehicle.

16. A vehicle control method comprising:
receiving, by a vehicle and from user input units, a control command for remotely controlling a vehicle;
transmitting the control command to one or more electronic devices located in the vehicle and configured to operate in accordance with the control command;
measuring communication quality between the user input units and the one or more vehicle electronic devices;
selecting, based on the communication quality, at least one of a plurality of cameras located in the vehicle;
transmitting, to the user input units, a plurality of images acquired from the selected at least one of a plurality of cameras, wherein measuring the communication quality includes measuring transmission latency and a transmission bandwidth for transmission of the plurality of images from the vehicle to a fifth generation (5G) base station;
determining, based on the measured communication quality, a viewing angle; and generating a VR image corresponding to the determined viewing angle, wherein, based on the measured communication quality being within a second range having a communication quality poorer than a communication quality of a first range, a second viewing angle of a second VR image is determined to be smaller than a first viewing angle of a first VR image, and wherein resolution of the first VR image with the first viewing angle is equal to resolution of the second VR image with the second viewing angle.

17. The vehicle control method according to claim 16, further comprising generating, based on one point of the vehicle and by using a plurality of images acquired from the plurality of cameras, a 360 degree virtual reality (360VR) image, wherein the image transmitted to the user input units is at least a portion of the 360VR image.

18. The vehicle control method according to claim 16, further comprising operating in a monitoring mode for monitoring the inside and the outside of the vehicle and a remote control mode for performing controls related to the vehicle by the user input unit,
providing, based on a determination to switch to the remote control mode from the monitoring mode according to the measured communication quality, guide information for switching from the monitoring mode to the remote control mode, and
wherein the guide information includes at least of one of a time for switching the monitoring mode to the remote control mode or a point where switching can be performed.

19. The vehicle control method according to claim 16, further comprising controlling, based on the communication quality, resolution of the image; and transmitting, to the user input units, a plurality of processed images by controlling the resolution of the plurality of images.

20. The vehicle control method according to claim 16, further comprising limiting, based on the communication quality, a maximum speed of the vehicle.

* * * * *

UNITED STATES PATENT AND TRADEMARK OFFICE
CERTIFICATE OF CORRECTION

PATENT NO. : 11,703,854 B2  
APPLICATION NO. : 16/732953  
DATED : July 18, 2023  
INVENTOR(S) : Minkyu Park et al.

Page 1 of 1

It is certified that error appears in the above-identified patent and that said Letters Patent is hereby corrected as shown below:

On the Title Page

After Item (65) Prior Publication Data, insert the following section:  
--(30) Foreign Application Priority Data  
Jan. 2, 2019 (KR) .............................. PCT/KR2019/000018--.

Signed and Sealed this  
Twenty-sixth Day of September, 2023

Katherine Kelly Vidal  
*Director of the United States Patent and Trademark Office*